UNITED STATES PATENT OFFICE.

ERIC KEIGHTLEY RIDEAL, OF LONDON, AND HUGH STOTT TAYLOR, OF ST. HELENS, ENGLAND.

PURIFICATION OF HYDROGEN.

1,375,932.   Specification of Letters Patent.   Patented Apr. 26, 1921.

No Drawing.   Application filed February 11, 1919.   Serial No. 276,373.

*To all whom it may concern:*

Be it known that we, ERIC KEIGHTLEY RIDEAL, residing at 48ª Cornwall Gardens, London, S. W., 7, England, and HUGH STOTT TAYLOR, of 41 Windle street, St. Helens, in the county of Lancaster, England, subjects of the King of Great Britain, have invented certain new and useful Improvements in the Purification of Hydrogen, of which the following is a specification.

This invention relates to the purification of hydrogen containing variable quantities of carbon monoxid as impurity, and is more particularly though not solely applicable to the treatment of hydrogen produced by liquefaction processes from water gas or by the steam-iron process, and to the treatment of waste gas from circulatory processes employing hydrogen in which carbon monoxid accumulates as an impurity.

The invention comprises a process for the purification of hydrogen from carbon monoxid which consists in submitting the hydrogen successively to two processes by the first of which the greater part of the carbon monoxid is converted into carbon dioxid, while by the second process the remainder of the carbon monoxid is removed by fractional combustion with air or oxygen. By such a combination of processes we find that the removal of the carbon monoxid can be effected much more economically and with much greater facility of operation than by the processes hitherto adopted for the purpose.

In carrying our invention into effect in one convenient manner we mix the gas to be purified with a limited amount of steam and pass the same over a suitable catalytic agent or agents maintained at a suitable temperature, whereby the greater portion of the carbon monoxid reacts with the steam to produce carbon dioxid and hydrogen. The resulting gas mixture is then admixed with suitable quantities of air or oxygen and passed over a second catalyst maintained at a somewhat lower temperature, whereby selective combustion of the remaining carbon monoxid with oxygen is effected and the final product obtained is a mixture of hydrogen, carbon dioxid, steam with occasionally a small quantity of oxygen and, if air be used, a small amount of nitrogen and other inert gases. The hydrogen may be separated by passing the final product through lime boxes or caustic soda scrubbers after condensation of the steam.

In a specific example applied to the purification of hydrogen containing from 2% to 4% of carbon monoxid the gas is mixed with half its volume of steam and passed over a catalytic agent such as oxid of iron admixed with a suitable promotor or promoters as for example one or more of the oxids of chromium, cerium, thorium and the like, the catalyst being maintained by suitable means at a temperature somewhere between 400° C. and 500° C. By this process the carbon monoxid present in the gas is reduced in amount to from 0.3% to 0.7% depending upon the percentage of carbon monoxid initially contained in the gas.

The gases produced by the first step of the process are then cooled from 400°–500° down to about 120°–250° C., and admixed with a small quantity of oxygen or air, the quantity of oxygen to be added slightly exceeding the theoretical quantity required to oxidize the remaining carbon monoxid to dioxid according to the reaction $2CO + O_2 = 2CO_2$. For example in the case under consideration, 0.7% of oxygen or 3.5% of air based upon the volume of gas being treated, would be sufficient. The mixture is then passed over a second catalyst mass maintained at the aforesaid temperature range of 120° to 250° C., the temperature to be employed varying with the nature of the catalyst. We have found that pure copper oxid or better a copper oxid, containing 10% or so of manganese oxid prepared by precipitating, drying and heating the hydroxids of these metals, can be used, say at 120° C., while a mixture of iron oxid 97% chromium oxid 2.5% and cerium oxid 0.5% (prepared by gentle ignition of the nitrates) is operative at the temperatures 190° to 250° C. Other oxid catalysts prepared in similar manner may likewise be utilized to effect the combustion of carbon monoxid at temperatures below those at which the former reaction above described (*i. e.*, the interaction of carbon monoxid and steam) takes place.

The velocity of flow is governed by the temperature, nature and size of the catalyst mass employed. Thus we have found that 500 cubic feet per hour can be easily dealt with with one cubic foot of catalytic material graded to one-half inch pieces suitably distributed in a container.

Such a dual process as that above indicated is found to be very advantageous in that the process is responsive, without alteration of the working conditions, to considerable variations in the carbon monoxid content of the original gases.

Furthermore, a quantity of steam only one-eighth of that required in the water gas reaction to produce hydrogen containing 0.1% of carbon monoxid is sufficient for the ultimate production of a gas of a higher state of purity, and as by the second part of the combined process less than 1% of carbon monoxid is removed by fractional combustion the troublesome heating effects observed with gases of higher carbon monoxid content are eliminated and the marginal excess of oxygen required is considerably reduced.

Finally the economic utilization of the bulk of the carbon monoxid to produce hydrogen is also insured by a process in accordance with the invention.

It is to be understood that we do not limit the application of the invention to any particular form of hydrogen to be treated nor to any particular process by which the same is produced, since with the utilization of our dual process economical modifications of existing methods of hydrogen manufacture may be introduced. For example, it is known that the production of a high grade hydrogen by the steam iron process entails the use of an elevated temperature and of various other expedients all of which modifications add considerably to the operating costs. On the other hand, if the steam-iron process is conducted at a lower temperature, resulting in considerable economies in the operating costs the quality of the hydrogen deteriorates, as much as 1-3% of carbon monoxid often being present. This quality of hydrogen, however, would be unsuitable for many technical purposes, but by the subsequent employment of our combined purification process its production could be permitted with the attendant economies in manufacture, even when a very high grade of hydrogen is required. Similar economies are also possible by the application of the purification process to the manufacture of hydrogen by the liquefaction process from water gas.

Although in the foregoing description we have given certain examples of catalytic agents and temperatures that may be employed, it is to be understood that we do not limit ourselves to any particular catalyst for either stage of the process nor to the temperatures at which the respective stages may be carried out, while at the same time we may vary the quantities of steam and air or oxygen employed, depending upon any particular practical requirements that may have to be fulfilled.

We claim:

1. A process of purifying hydrogen containing carbon monoxid as an impurity which comprises adding steam to such hydrogen, passing the mixture in contact with a catalyst at such a temperature as to convert the major part of the carbon monoxid into carbon dioxid, then adding an oxygen-containing gas and passing the mixture in contact with a catalyst at a temperature at which oxygen will combine with carbon monoxid in preference to hydrogen.

2. A process of purifying hydrogen containing carbon monoxid as an impurity which comprises adding steam to such hydrogen, the amount of steam being in substantial excess over the amount demanded by the reaction $CO+H_2O=CO_2+H_2$, passing the mixture in contact with a catalyst at such a temperature as to convert the major part of the carbon monoxid into carbon dioxid, then adding an oxygen-containing gas and passing the mixture in contact with a catalyst at a temperature at which oxygen will combine with carbon monoxid in preference to hydrogen.

3. A process of purifying hydrogen containing carbon monoxid as an impurity, such process comprising first adding steam to such hydrogen, then passing the same in contact with a catalyst at a high temperature to cause the reaction $CO+H_2O=CO_2+H_2$ to take place, with a major portion of the CO present, then adding an oxygen-containing gas in amount at least chemically equivalent to the remaining CO therein, then passing the mixture in contact with a catalyst, at a temperature lower than that used in such first catalysis to cause the reaction $CO+O=CO_2$ to take place with substantially all of the remaining CO in the gas.

4. In the removal of CO from hydrogen gas containing the same, the step of oxidizing the major portion of the CO to $CO_2$ by steam, and thereafter oxidizing the residual CO to $CO_2$ by free oxygen.

In testimony whereof we have signed our names to this specification.

ERIC KEIGHTLEY RIDEAL.
HUGH STOTT TAYLOR.